(12) United States Patent
Safai (10) Patent No.: US 11,061,149 B2
(45) Date of Patent: Jul. 13, 2021

(54) X-RAY BACKSCATTERING DETECTOR

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/544,523

(22) Filed: Aug. 19, 2019

(65) Prior Publication Data

US 2021/0055433 A1 Feb. 25, 2021

(51) Int. Cl.
| | |
|---|---|
| *G01T 1/20* | (2006.01) |
| *C09K 11/06* | (2006.01) |
| *C09K 11/61* | (2006.01) |
| *C09K 11/66* | (2006.01) |
| *C09K 11/68* | (2006.01) |
| *G01N 23/203* | (2006.01) |

(52) U.S. Cl.
CPC ............ *G01T 1/2006* (2013.01); *C09K 11/06* (2013.01); *C09K 11/616* (2013.01); *C09K 11/664* (2013.01); *C09K 11/684* (2013.01); *G01N 23/203* (2013.01); *C01P 2006/60* (2013.01); *C09K 2211/14* (2013.01); *G01N 2223/5055* (2013.01)

(58) Field of Classification Search
CPC .................................................. G01T 1/2008
See application file for complete search history.

(56) References Cited

U.S. PATENT DOCUMENTS

| | | | | |
|---|---|---|---|---|
| 2009/0261262 | A1* | 10/2009 | Hunt .................... | G01T 1/2002 250/370.11 |
| 2010/0034353 | A1 | 2/2010 | Kravis et al. | |
| 2011/0127435 | A1* | 6/2011 | Nakamura ........... | G01T 1/1644 250/362 |
| 2018/0172852 | A1* | 6/2018 | Newman ............... | G01T 1/2008 |
| 2019/0056515 | A1* | 2/2019 | Kobayashi ........... | G01T 1/2008 |

FOREIGN PATENT DOCUMENTS

| | | |
|---|---|---|
| EP | 2889643 | 7/2015 |
| FR | 2325943 | 4/1997 |
| GB | 687231 | 2/1953 |

OTHER PUBLICATIONS

Extended European Search Report concerning EP Patent Application No. 20176155.8 dated Nov. 18, 2020.

* cited by examiner

*Primary Examiner* — Hoon K Song
(74) *Attorney, Agent, or Firm* — Kunzler Bean & Adamson (57) ABSTRACT

Disclosed herein is a scintillator for use in an x-ray backscattering system. The scintillator comprises an inorganic scintillator portion made of inorganic scintillating material and comprising one or more inorganic material elements. Each inorganic material element of the one or more inorganic material elements comprises an outer surface, and an inner surface opposite the outer surface. The outer surface is configured to be proximate to a subject to be scanned, such that the outer surface is configured to receive x-ray photons scattered by the subject. The scintillator also comprises an organic scintillator portion made of an organic scintillating material and comprising a front surface. At least a portion of the front surface abuts the inner surface of at least one of the one or more inorganic material elements.

20 Claims, 7 Drawing Sheets

Dispose a layer of organic scintillator material on a substrate, the layer defining a plurality of voids at a front surface of the layer
502

Remove an amount of the organic scintillator material at a plurality of locations of the front surface
502a Dispose one or more inorganic scintillator elements within one or more of the voids at the front surface of the layer
504

X-RAY BACKSCATTERING DETECTOR

FIELD

This disclosure relates generally to detection of scattered x-rays in x-ray backscattering systems, and more particularly detection of scattered x-rays using a scintillator comprising inorganic scintillating material and organic scintillating material.

BACKGROUND

An x-ray backscattering system can be used to non-destructively inspect a subject, including detecting non-line-of-site features of the subject. Conventional x-ray backscattering systems include an x-ray tube and detectors. The detectors include a photomultiplier tube (PMT) and scintillators. The x-ray tube emits x-rays toward the subject. When the x-rays collide with components of the subject, the x-rays diffract and some of the x-ray photons travel toward the detectors. When the x-ray photons hit an outer surface of a scintillator, some x-rays reflect off of the outer surface and some x-rays penetrate the outer surface. Of the x-rays that penetrate the outer surface, some x-rays hit a back surface of the scintillator and reflect back within the scintillator, while others penetrate the back surface and exit the scintillator.

The PMT detects photoelectric emissions that occur when an electron of an atom of the scintillator absorbs energy from an x-ray to excite the electron to a higher-energy state, which electron then falls back to its initial state while causing the photoelectric emission. The PMT may detect a quantity of photoelectric emissions within the scintillator. Alternatively, the PMT may detect a brightness of the total effect of the photoelectric emissions within the scintillator.

Some deficiencies with conventional x-ray backscattering systems involve an inability to absorb energy from x-rays traveling toward the detectors. For example, when x-rays reflect off of the outer surface of the scintillator or penetrate the back surface and exit the scintillator, opportunities to absorb energy from the x-rays are lost. These deficiencies may be caused by a large distribution of energies of various x-rays diffracted from the components of the subject. For example, a scintillator calibrated (e.g., by a selected thickness of material) for x-rays having a median expected energy may result in relatively low energy x-rays reflecting off of the outer surface and/or relatively high energy x-rays penetrating through the back surface.

To compensate for some of these deficiencies, some x-ray backscattering systems use a relatively high x-ray power supply to generate a sufficient quantity of x-rays for which the scintillator is calibrated. This way, even though the scintillator may not absorb energy from low energy and high energy x-rays, the scintillator can still detect enough x-rays to provide information for imaging the subject. However, these high-power x-ray backscattering systems are more expensive to produce and operate and less portable.

Therefore, a need exists for an x-ray backscattering system that has a scintillator configured to absorb energy from x-rays having a relatively broad range of energies.

SUMMARY

The subject matter of the present application provides example scintillators, x-ray backscattering systems implementing such scintillators, methods of using scintillators, and methods of manufacturing scintillators that overcome the above-discussed shortcomings of prior art techniques. The subject matter of the present application has been developed in response to the present state of the art, and in particular, in response to shortcomings of conventional scintillators, and the conventional methods and systems for producing scintillators and operating x-ray backscattering systems to detect x-rays.

Disclosed herein is a scintillator comprising an inorganic scintillator portion made of an inorganic scintillating material and comprising an organic scintillator portion made of an organic scintillator portion made of an organic scintillating material. The inorganic scintillator portion comprises one or more inorganic material elements. Each of the inorganic material elements comprises an outer surface and an inner surface, opposite the outer surface. The outer surface is configured to be proximate to a subject to be scanned with the x-ray backscattering system, such that the outer surface is configured to receive x-ray photons scattered by the subject. The organic scintillator portion comprises a front surface, wherein at least a portion of the front surface abuts the inner surface of at least one of the one or more inorganic material elements. The preceding subject matter of this paragraph characterizes example 1 of the present disclosure.

The inorganic scintillator portion further comprises a plurality of the inorganic material elements, spaced apart relative to each other. The plurality of the inorganic material elements are disposed on corresponding spaced-apart first sections of the front surface of the organic scintillator portion. The second sections of the front surface of the organic scintillator portion are devoid of the inorganic material elements. The preceding subject matter of this paragraph characterizes example 2 of the present disclosure, wherein example 2 also includes the subject matter according to example 1, above.

The plurality of spaced-apart first sections of the front surface of the organic scintillator portion are recessed from the second sections of the front surface of the organic scintillator portion that is devoid of the inorganic scintillating material. The preceding subject matter of this paragraph characterizes example 3 of the present disclosure, wherein example 3 also includes the subject matter according to example 2, above.

The inorganic scintillator portion comprises an inorganic material element disposed upon substantially all of the front surface of the organic scintillator portion. The preceding subject matter of this paragraph characterizes example 4 of the present disclosure, wherein example 4 also includes the subject matter according example 1, above.

The inorganic scintillating material has an index of refraction that is different from an index of refraction of the organic scintillating material. The preceding subject matter of this paragraph characterizes example 5 of the present disclosure, wherein example 5 also includes the subject matter according to any one of examples 1-4, above.

The scintillator further comprises a second inorganic scintillator portion made of a second inorganic scintillating material. The organic scintillator portion further comprises a back surface, opposite the front surface. The second inorganic scintillator portion is disposed on the back surface of the organic scintillator portion. The preceding subject matter of this paragraph characterizes example 6 of the present disclosure, wherein example 6 also includes the subject matter according to any one of examples 1-5, above.

The inorganic scintillating material and the second inorganic scintillating material are the same. The preceding subject matter of this paragraph characterizes example 7 of the present disclosure, wherein example 7 also includes the subject matter according to example 6, above.

The scintillator comprises a third inorganic scintillator portion made of a third inorganic scintillating material. The organic scintillator portion further comprises one or more side surfaces that extend between the front surface and the back surface. The third inorganic scintillator portion is disposed on the one or more side surfaces of the organic scintillator portion. The preceding subject matter of this paragraph characterizes example 8 of the present disclosure, wherein example 8 also includes the subject matter according to any one of examples 6-7, above.

The organic scintillating material comprises one or more of plastic and polyurethane. The preceding subject matter of this paragraph characterizes example 9 of the present disclosure, wherein example 9 also includes the subject matter according to any one of examples 1-8, above.

The inorganic scintillating material comprises one or more of lead iodide ($PbI_2$), calcium tungstate ($CaWO_4$), and cesium iodide (CsI). The preceding subject matter of this paragraph characterizes example 10 of the present disclosure, wherein example 10 also includes the subject matter according to any one of examples 1-9, above.

Each of the one or more inorganic material elements have a thickness, defined between the outer surface and the inner surface. The thickness corresponds to an energy of x-rays to be emitted by the x-ray backscattering system. The preceding subject matter of this paragraph characterizes example 11 of the present disclosure, wherein example 11 also includes the subject matter according to any one of examples 1-10, above.

The organic scintillator portion further comprises a back surface, opposite the front surface. The organic scintillator portion is configured with a thickness, defined between the front surface and the back surface. The thickness corresponds to an energy of x-rays to be used in the x-ray backscattering system. The preceding subject matter of this paragraph characterizes example 12 of the present disclosure, wherein example 12 also includes the subject matter according to any one of examples 1-11, above.

The organic scintillator portion couples the inorganic scintillator portion 112 with a photomultiplier tube. The preceding subject matter of this paragraph characterizes example 13 of the present disclosure, wherein example 13 also includes the subject matter according to any one of examples 1-12, above.

Additionally disclosed herein is a method of producing a scintillator. The method comprises disposing a layer of organic scintillating material on a substrate. The layer of organic scintillating material comprises a back surface, adjacent to the substrate, and a front surface. The layer of organic scintillating material defines a plurality of voids at the front surface. The method also comprises disposing one or more inorganic material elements within one or more of the plurality of voids. The preceding subject matter of this paragraph characterizes example 14 of the present disclosure.

Disposing a layer of organic scintillating material on a substrate comprises removing an amount of the organic scintillating material at a plurality of locations of the front surface. The removed amount of organic scintillating material defining the plurality of voids at the front surface. The preceding subject matter of this paragraph characterizes example 15 of the present disclosure, wherein example 15 also includes the subject matter according to example 14, above.

The plurality of voids have thicknesses between 1 and 100 microns. The preceding subject matter of this paragraph characterizes example 16 of the present disclosure, wherein example 16 also includes the subject matter according to any of examples 14 and 15, above.

The layer of organic scintillating material has a thickness, defined between the front surface and the back surface. The thickness of the layer of organic scintillating material is between 0.5 and 10 inches. The preceding subject matter of this paragraph characterizes example 17 of the present disclosure, wherein example 17 also includes the subject matter according to any of examples 14-16, above.

Further disclosed herein is a method of operation of an x-ray backscattering system. The method comprises transmitting, via an x-ray tube of the x-ray backscattering system, x-rays toward a subject. The method also comprises detecting, via a scintillator of the x-ray backscattering system, one or more x-ray photons scattered by the subject. The scintillator comprises an inorganic scintillator portion, made of an inorganic scintillating material, and an organic scintillator portion made of an organic scintillating material. The inorganic scintillating material comprises one or more inorganic material elements. Each inorganic material element of the one or more inorganic material elements comprises an outer surface proximate to the subject and an inner surface opposite the outer surface. The organic scintillator portion comprises a front surface, wherein at least a portion of the front surface abuts the inner surface of at least one of the one or more inorganic material elements. The preceding subject matter of this paragraph characterizes example 18 of the present disclosure.

Detecting one or more x-ray photons scattered by the subject comprises receiving at least one of the one or more x-ray photons via the inorganic scintillator portion. Detecting one or more x-ray photons scattered by the subject also comprises generating, in response receiving the at least one of the one or more x-ray photons, a photoelectric emission within the scintillator. Detecting one or more x-ray photons scattered by the subject further comprises detecting the photoelectric emission via a photomultiplier tube of the x-ray backscattering system. The preceding subject matter of this paragraph characterizes example 19 of the present disclosure, wherein example 19 also includes the subject matter according to example 18, above.

The method further comprises providing to an imaging device, based on transmitting and detecting, information usable for generating an x-ray image of the subject. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein are scintillators that each have an organic scintillator portion and an inorganic scintillator portion. The inorganic scintillator portion includes inorganic scintillating material disposed upon all, or a portion of, of a front surface of the organic scintillator portion. Further, in some examples, the inorganic scintillator portion is also disposed on a back surface and/or side surfaces of the organic scintillator portion.

The inorganic scintillating material may be embedded into the front surface of the organic scintillating material. For example, a process of manufacturing a scintillator may include disposing a layer of organic scintillating material on a substrate, with the layer of organic scintillating material defining a plurality of voids at its front surface. The process then includes disposing one or more inorganic material elements within the plurality of voids, thus embedding the inorganic material elements into the front surface of the layer of organic scintillating material.

When compared with a conventional x-ray backscattering system operating with a same power supply, an x-ray backscattering system having one or more scintillators, as described herein, may detect an increased quantity of photoelectric emissions based on absorbing additional energy from scattered x-rays having relatively high and/or relatively low energies. This can be used to produce an x-ray image with improved resolution. Additionally, when compared with conventional x-ray backscattering systems that produce an x-ray image with similar resolution, the x-ray backscattering system described herein may consume less power, have lower manufacturing costs, and/or have better portability based on size and weight of the system.

Figure 1:
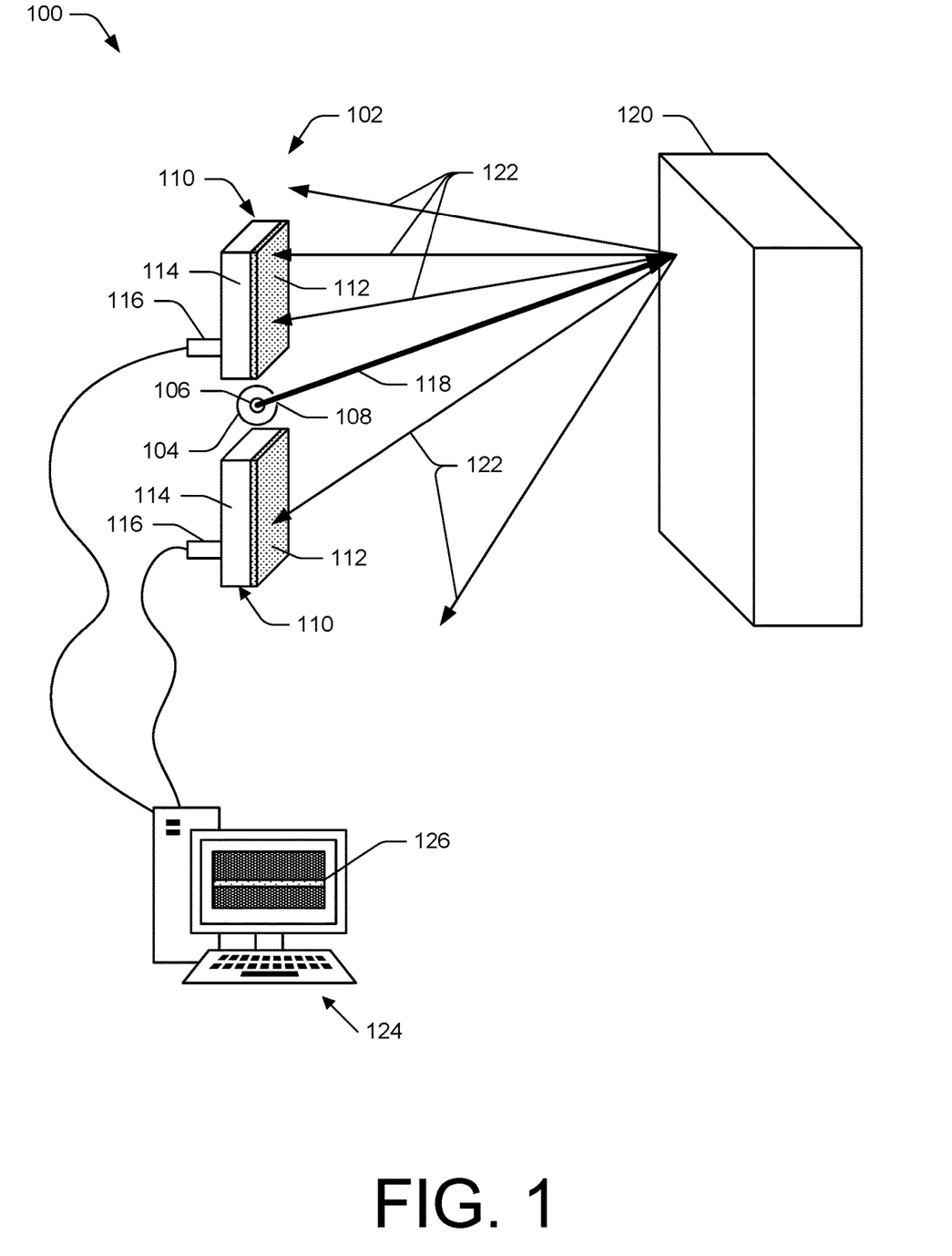
FIG. 1 is a schematic perspective view of an x-ray backscattering system, inspecting a part, according to one or more examples of the present disclosure.

Referring to FIG. 1, according to some examples, disclosed herein is a non-destructive inspection system 100 in which an x-ray backscattering system 102 can be implemented according to one or more examples of the present disclosure. The x-ray backscattering system 102 includes an x-ray source, such as an x-ray tube 104. The x-ray tube 104 may include an x-ray emitter 106 and an aperture 108 through which emitted x-rays can exit the x-ray tube 104 toward a subject for scanning.

The x-ray backscattering system 102 also includes one or more scintillators 110. The one or more scintillators 110 include an inorganic scintillator portion 112 made of an inorganic scintillating material, such as one or more of lead iodide ($PbI_2$), calcium tungstate ($CaWO_4$), and cesium iodide (CsI). The one or more scintillators 110 also include an organic scintillator portion 114 made of an organic scintillating material, such as a plastic, polyurethane, or another carbon-based material.

In some embodiments, the inorganic scintillating material has an index of refraction that is different from an index of refraction of the organic scintillating material. This may cause x-ray photons 122, upon hitting an interface between the inorganic scintillator portion 112 and the organic scintillator portion 114, to change their vectors. For example, one or more of the x-ray photons 122 may reflect back within the inorganic scintillator portion 112. Additionally or alternatively, one or more of the x-ray photons 122 may penetrate the organic scintillator portion 114 and may change its trajectory upon penetration. A change of vector may cause the scintillator 110 to absorb energy from the x-ray photons 122 and cause photoelectric emissions for detection by the PMT 116, as described below.

The x-ray backscattering system 102 also includes a photomultiplier tube (PMT) 116 coupled to the scintillator 110. For example, the PMT 116 may be coupled to the organic scintillator portion 114, which couples the inorganic scintillator portion 112 with the PMT 116. Collectively, the scintillator 110 and the PMT 116 may be defined as a detector.

In an example operation of the x-ray backscattering system 102, the x-ray emitter 106 draws from a power supply to emit x-rays 118 via the aperture 108 toward a subject 120. The subject 120 is a part (e.g., component, device, assembly, etc.) prior to use or after use. Moreover, the subject 120 can be removed from a larger assembly for inspection or it may be inspected while in situ on or in the larger assembly. When the x-rays 118 collide with components of the subject 120, the x-rays 118 diffract, resulting in some of the diffracted x-ray photons 122 traveling toward the one or more scintillators 110.

When the diffracted x-ray photons 122 hit an outer surface of the scintillator 110, at least some of the diffracted x-ray photons 122 enter the inorganic scintillator portion 112 before hitting the organic scintillator portion 114. A set of the diffracted x-ray photons 122 that enter the inorganic scintillating material 112 transfer energy to particles of one or both of the organic scintillator portion 114 and the inorganic scintillator portion 112, which in turn release photoelectric emissions that are detected by the PMT 116. This process can be described as the scintillator 110 absorbing energy from the diffracted x-ray photons 122. Because the scintillator 110 includes the inorganic scintillator portion 112 and the organic scintillator portion 114, the scintillator 110 is more likely to absorb energy from diffracted x-ray photons 122 having relatively high and/or relatively low energies.

The PMT 116 may then provide information, based on the detection of photoelectric emissions, to an imaging device 124 of the non-destructive inspection system 100. The imaging device 124 is usable for generating an x-ray image 126 of the subject 120. The information may include a count of detected photoelectric emissions or an indication of a brightness based on detection of photoelectric emissions. The count or brightness may also be associated with a location of the subject 120. For example, the count or brightness may be associated with a location of the subject 120 at which the x-rays 118 are directed. The information may further include a plurality of counts or brightnesses, each associated with a respective one of a plurality of locations of the subject 120 at which the x-rays 118 are directed. This association may be determined based on a time at which the PMT 116 detects photoelectric emissions and an indication of a location of the subject 120 at which the x-rays 118 are directed at the time of detection.

FIGS. 2a-2h show side views of examples of a scintillator, similar to the scintillator 110, with like numbers referring to like elements. The various scintillators shown in FIGS. 2a-2h help to show some of various examples of an inorganic scintillator portion 112 and an organic scintillator portion 114.

Figure 2A:
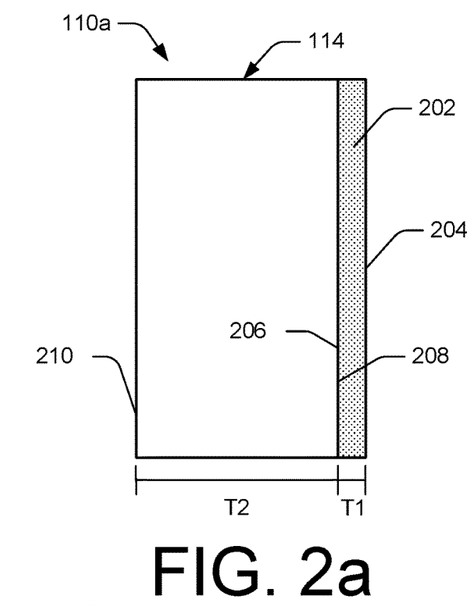
FIGS. 2a-2h are side views of respective examples of a scintillator of the x-ray backscattering system of FIG. 1.

Referring to FIG. 2a, according to one example, the inorganic scintillator portion 112 of a scintillator 110a comprises an inorganic material element 202. The inorganic material element 202 comprises an outer surface 204 and an inner surface 206, with the inner surface 206 opposite the outer surface 204. The outer surface 204 is configured to be proximate to the subject 120 to be scanned with the x-ray backscattering system 102 such that the outer surface 204 is configured to receive x-ray photons 122 scattered by the subject 120. The inorganic material element 202 has a thickness T1, defined between the outer surface 204 and the inner surface 206. The thickness T1 may be selected to correspond to energies of x-rays to be emitted by the x-ray backscattering system 102. In some embodiments, the thickness T1 is between 1 and 100 microns. In particular, the thickness T1 may be about 10 microns.

The organic scintillator portion 114 of the scintillator 110a comprises a front surface 208 and a back surface 210, with the back surface 210 opposite the front surface 208. At least a portion of the front surface 208 abuts the inner surface 206 of the inorganic material element 202. The organic scintillator portion 114 has a thickness T2, defined between the front surface 208 and the back surface 210. The thickness T2 may be selected to correspond to energies of x-rays 118 to be emitted by the x-ray backscattering system 102. In some embodiments, the thickness T2 is between 0.5 and 10 inches. In particular, the thickness T1 may be about 1 inch.

Figure 2B:
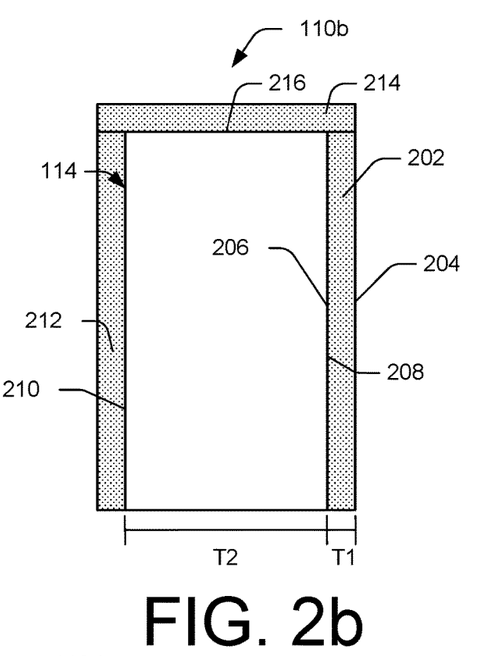

Referring to FIG. 2b, another example of a scintillator 110b comprises multiple inorganic scintillator portions disposed on multiple surfaces of the organic scintillator portion 114.

In addition to the inorganic scintillator portion 202 disposed on the front surface 208 of the organic scintillator portion 114, the scintillator 110b may include a second inorganic scintillator portion 212, made of a second inorganic scintillating material, disposed on the back surface 210 of the organic scintillator portion 114. Additionally or alternatively, the scintillator 110b may include a third inorganic scintillator portion 214, made of a third inorganic scintillating material, disposed on one or more side surfaces 216 of the organic scintillator portion 114. The side surfaces 216 may include any or all surfaces extending between the front surface 208 and the back surface 210.

The first inorganic scintillating material and the second inorganic scintillating material may be the same. Additionally or alternatively, the first and the third inorganic scintillating material may be the same, the second and the third inorganic scintillating material may be the same, or each of the scintillating materials may be the same. In other embodiments, each of the inorganic scintillating materials may be different.

In first example of the scintillator 110a and the second example of the scintillator 110b, shown in FIGS. 2a and 2b, the inorganic scintillator portion 112 comprises an inorganic material element 202 disposed upon substantially all of the front surface 208 of the organic scintillator portion 114. However, in the embodiments discussed below, the inorganic scintillator portion 112 comprises a plurality of inorganic material elements 202 and only a portion of the front surface 208 abuts an inner surface 206 the plurality of inorganic material elements 202.

Referring to FIGS. 2c-2h, the inorganic scintillator portion 112 of scintillators 110b-110h comprises a plurality of inorganic material elements 202. Each of the inorganic material elements 202 comprise an outer surface 204 configured to be proximate to the subject 120 and an inner surface 206 opposite the outer surface. As shown, each of the inorganic material elements 202 are space apart relative to each other. The inorganic material elements 202 have respective diameters (D), which may be common for all or some of the inorganic material elements 202.

The front surface 208 of the organic scintillator portion 114 comprises one or more spaced-apart first sections 218 and one or more second sections 220, which second sections 220 may be connected or spaced-apart. The inorganic material elements 202 are disposed on corresponding spaced-apart first sections 218 of the front surface 208 of the organic scintillator portion 114. The second sections 220 of the front surface 208 of the organic scintillator portion 114 are devoid of the inorganic material elements 202.

Figure 2C:
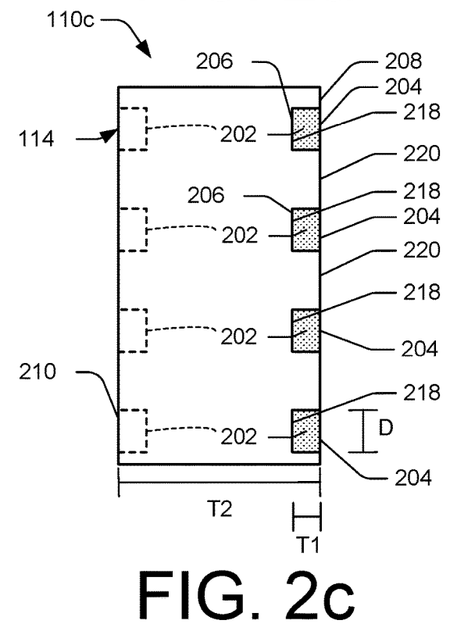

Referring to FIG. 2c, according to another example, the scintillator 110c comprises a plurality of inorganic scintillator elements 202 embedded in the organic scintillator portion 114. The one or more spaced-apart first sections 218 of the front surface 208 are recessed from the one or more second sections 220 of the front surface 208. In other words, a thickness T2 is greater between the back surface and the one or more second sections 220 than a thickness between the back surface and the one or more spaced-apart first sections 218. Additionally, the outer surface 204 of one or more of the inorganic scintillator elements 202 may be generally coplanar with the one or more second sections 220 of the front surface 208. In some alternative examples, an additional set of inorganic scintillator elements 202 are embedded in the back surface 210 of the organic scintillator portion 114, as shown in dashed line.

The inorganic scintillator elements 202 of the scintillator 110c may be, for example, cylindrical or a rectangular prism.

Figure 2D:
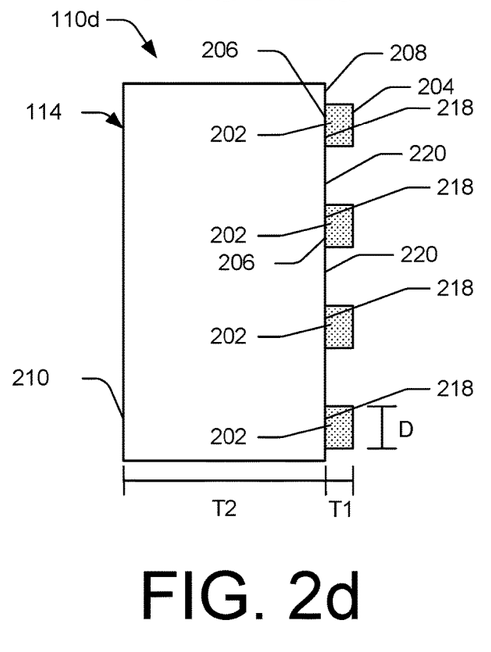

Referring to FIG. 2d, according to another example, the scintillator 110d comprises a plurality of inorganic scintillator elements 202 disposed on a generally planar portion of the front surface 208. The one or more spaced-apart first sections 218 of the front surface 208 are generally coplanar with the one or more second sections 220 of the front surface 208 between the one or more spaced-apart first sections.

Figure 2E:
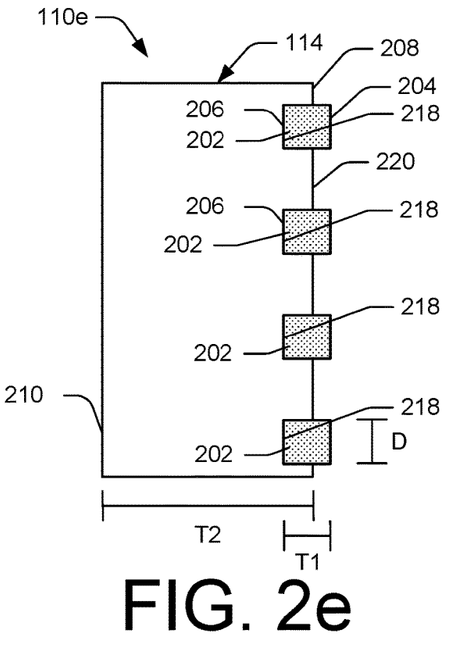

Referring to FIG. 2e, according to yet another example, the scintillator 110e comprises a plurality of inorganic scintillator elements 202 partially embedded in the organic scintillator portion 114. The one or more spaced-apart first sections 218 of the front surface 208 are recessed from the one or more second sections 220 of the front surface 208. However, in contrast to the scintillator 110c, the outer surface 204 of the inorganic scintillator elements 202 extend outwardly from the one or more second sections 220 (i.e., the one or more second sections 220 are recessed from the outer surface 204).

Figure 2F:
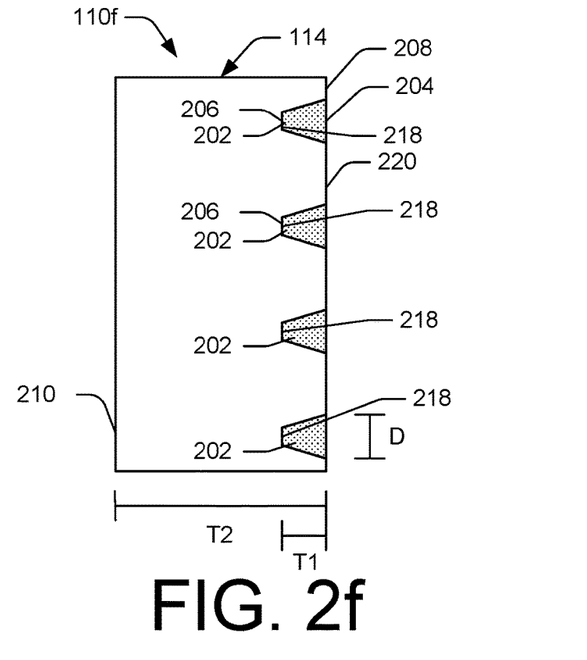

Referring to FIG. 2f, according to a further example, the scintillator 110f comprises a plurality of inorganic scintillator elements 202 embedded in the organic scintillator portion 114. Each of the inorganic scintillator elements 202 has a diameter D that decreases from the outer surface 204 to the inner surface 206. In other words, the inorganic scintillator elements 202 have angled side surfaces that are not orthogonal to one or both of the outer surface 204 and the inner surface 206. These angled side surfaces may increase a probability that x-ray photons 122 passing through the inorganic scintillator elements 202 hit the organic scintillator portion 114 at surface that is not orthogonal to the path of the x-ray photons 122. This may increase a likelihood that the x-ray photons 122 travel a longer distance through the scintillator 114, and likewise increase a probability of the scintillator 110 absorbing energy from the x-ray photons 122 and producing a detectable photoelectric emission.

The inorganic scintillator elements 202 of the scintillator 110f may be, for example, frustoconical or a trapezoidal prism.

Figure 2G:
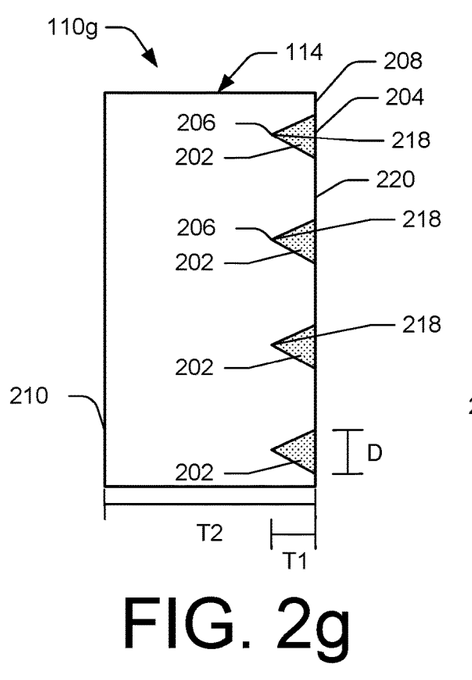

Referring to FIG. 2g, in another example, the scintillator 110g comprises a plurality of inorganic scintillator elements 202 embedded in the organic scintillator portion 114. Similar to the inorganic scintillator elements 202 of the scintillator 110f, each of the inorganic scintillator elements 202 of the scintillator 110g has a diameter D that decreases from the outer surface 204 to the inner surface 206. However, in contrast, the inner surface 206 of the scintillator 110g is an edge or a point, rather than a surface that is generally parallel to the outer surface 204.

The inorganic scintillator elements 202 of the scintillator 110g may be, for example, conical or a triangular prism.

Figure 2H:
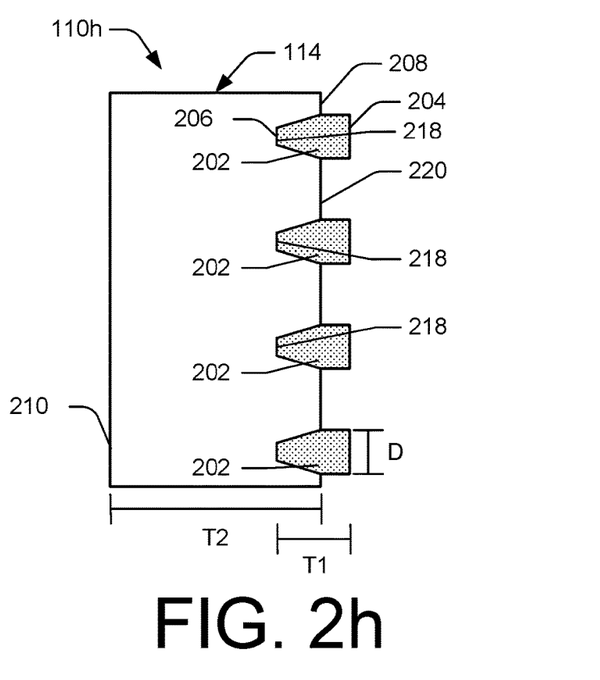

Referring to FIG. 2h, according to another example, the scintillator 110h comprises a plurality of inorganic scintillator elements 202 partially embedded in the organic scintillator portion 114. Similar to the inorganic scintillator elements 202 of the scintillator 110f, each of the inorganic scintillator elements 202 of the scintillator 110g has a diameter D that decreases from the outer surface 204 to the inner surface 206. However, in contrast, the inorganic scintillator elements 202 include a portion with a generally uniform diameter. The portion with the generally uniform diameter may be the portion of the inorganic scintillator elements 202 that is not embedded in the organic scintillator portion 114 (i.e., the portion outward from the second sections 220 of the front surface 208 of the organic scintillator portion 114).

FIGS. 3a-3d show top views of non-limiting examples of various scintillators 110i through 110l, which can be scintillators of the x-ray backscattering system 102. Aspects of one or more of the scintillators 110i-110l may be combined with aspects of one or more of the scintillators 110a-110h.

Figure 3A:
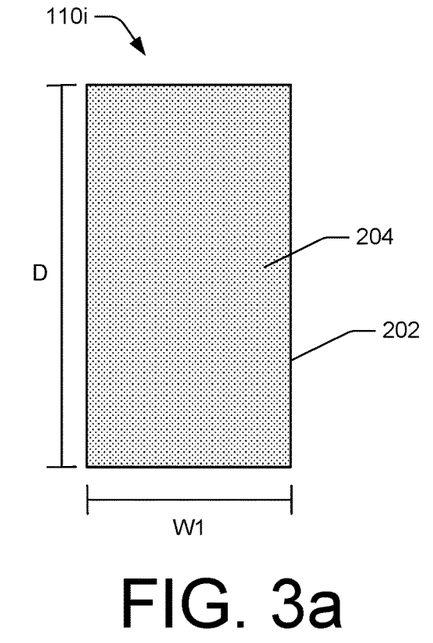
FIGS. 3a-3d are top views of respective examples of a scintillator of the x-ray backscattering system of FIG. 1.

Referring to FIG. 3a, according to another example, the scintillator 110i comprises an inorganic material element 202, having an outer surface 204, disposed upon substantially all of the front surface 208 of the organic scintillator portion 114 (shown in FIGS. 2a-2h). The outer surface 204 of the inorganic material element 202 has a diameter D and a width W1.

Figure 3B:
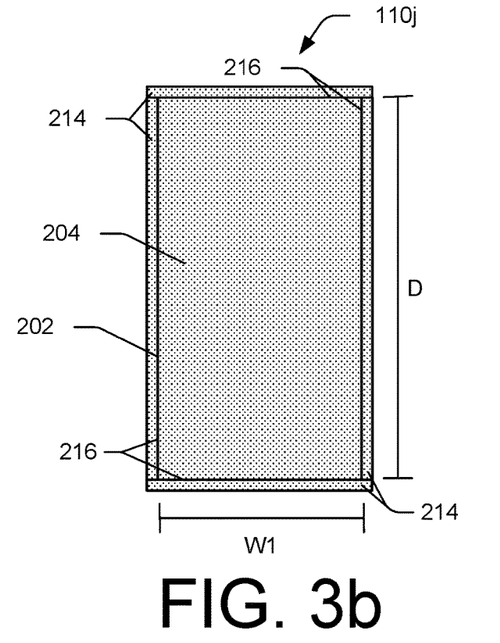

Referring to FIG. 3b, according to another example, the scintillator 110j comprises an inorganic material element 202, having an outer surface 204, disposed upon substantially all of the front surface 208 of the organic scintillator portion 114 (shown in FIGS. 2a-2h). As in the scintillator 110i, the outer surface 204 of the inorganic material element 202 has a diameter D and a width W1.

In addition to the inorganic scintillator portion 202 disposed on the front surface 208 of the organic scintillator portion 114 (shown in FIGS. 2a-2h), the scintillator 110j includes a third inorganic scintillator portion 214, made of a third inorganic scintillating material, disposed on one or more side surfaces 216 of the organic scintillator portion 114. The side surfaces 216 may include any or all surfaces extending between the front surface 208 and the back surface 210.

Figure 3C:
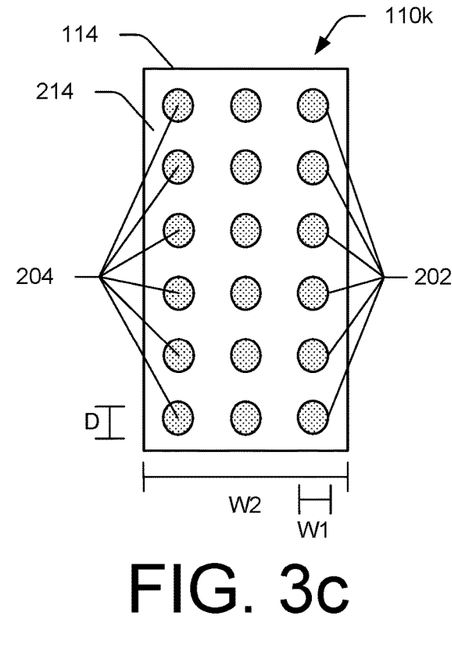

Referring to FIG. 3c, according to another example, the scintillator 110k comprises a plurality of inorganic material elements 202, having outer surfaces 204, disposed upon spaced-apart first sections 218 (shown in FIGS. 2a-2h) of the front surface 208 of the organic scintillator portion 114. A second section 220 of the front surface 208 is devoid of the inorganic material elements 202.

The inorganic material elements 202 have a diameter D and a width W1, which may be the same for all inorganic material elements 202. Alternatively, one or more of the diameter D and the width W1 may be different for respective ones or groups of inorganic material elements 202. The organic scintillator portion 114 has a width W2 that may be greater than the width W1 of the inorganic material elements 202.

The inorganic material elements 202 of the scintillator 110k may be, for example, cylindrical or conical. Additionally or alternatively, the inorganic material elements 202 may be embedded or partially embedded into the organic scintillator portion 114.

The inorganic material elements 202 may be distributed evenly, randomly, or with different predetermined densities across the front surface 208 of the organic scintillator portion 114. For example, the inorganic material elements 202 may be distributed with relatively high density at a location of the scintillator 110k that is closest to the x-ray source and with a relatively low density at a location of the scintillator 110 that is farthest from the x-ray source.

Figure 3D:
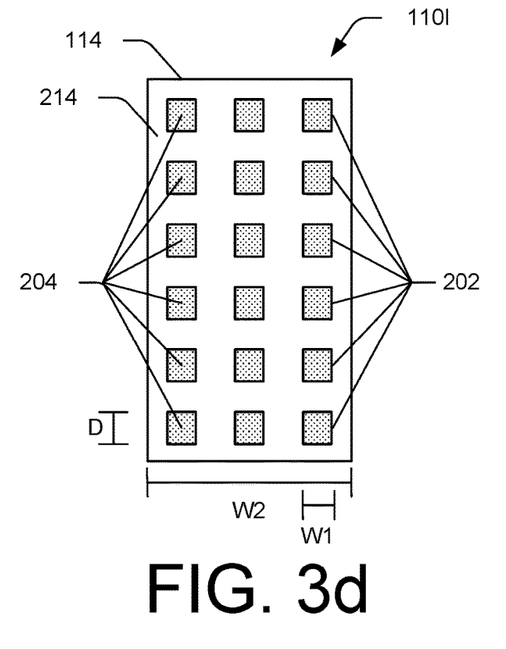

Referring to FIG. 3d, according to another example, the scintillator 110l comprises a plurality of inorganic material elements 202, having outer surfaces 204, disposed upon spaced-apart first sections 218 (shown in FIGS. 2a-2h) of the front surface 208 of the organic scintillator portion 114. A second section 220 of the front surface 208 is devoid of the inorganic material elements 202.

Similar to the inorganic material elements 202 of the scintillator 110k, the inorganic material elements 202 of the scintillator 110l have a diameter D and a width W1, which may be the same for all inorganic material elements 202. Alternatively, one or more of the diameter D and the width W1 may be different for respective ones or groups of inorganic material elements 202. The organic scintillator portion 114 has a width W2 that may be greater than the width W1 of the inorganic material elements 202.

The inorganic material elements 202 of the scintillator 110k may be, for example, a rectangular or trapezoidal prism. Additionally or alternatively, the inorganic material elements 202 may be embedded or partially embedded into the organic scintillator portion 114. Further, the inorganic material elements 202 may be distributed evenly, randomly, or with different predetermined densities across the front surface 208 of the organic scintillator portion 114.

Figure 4:
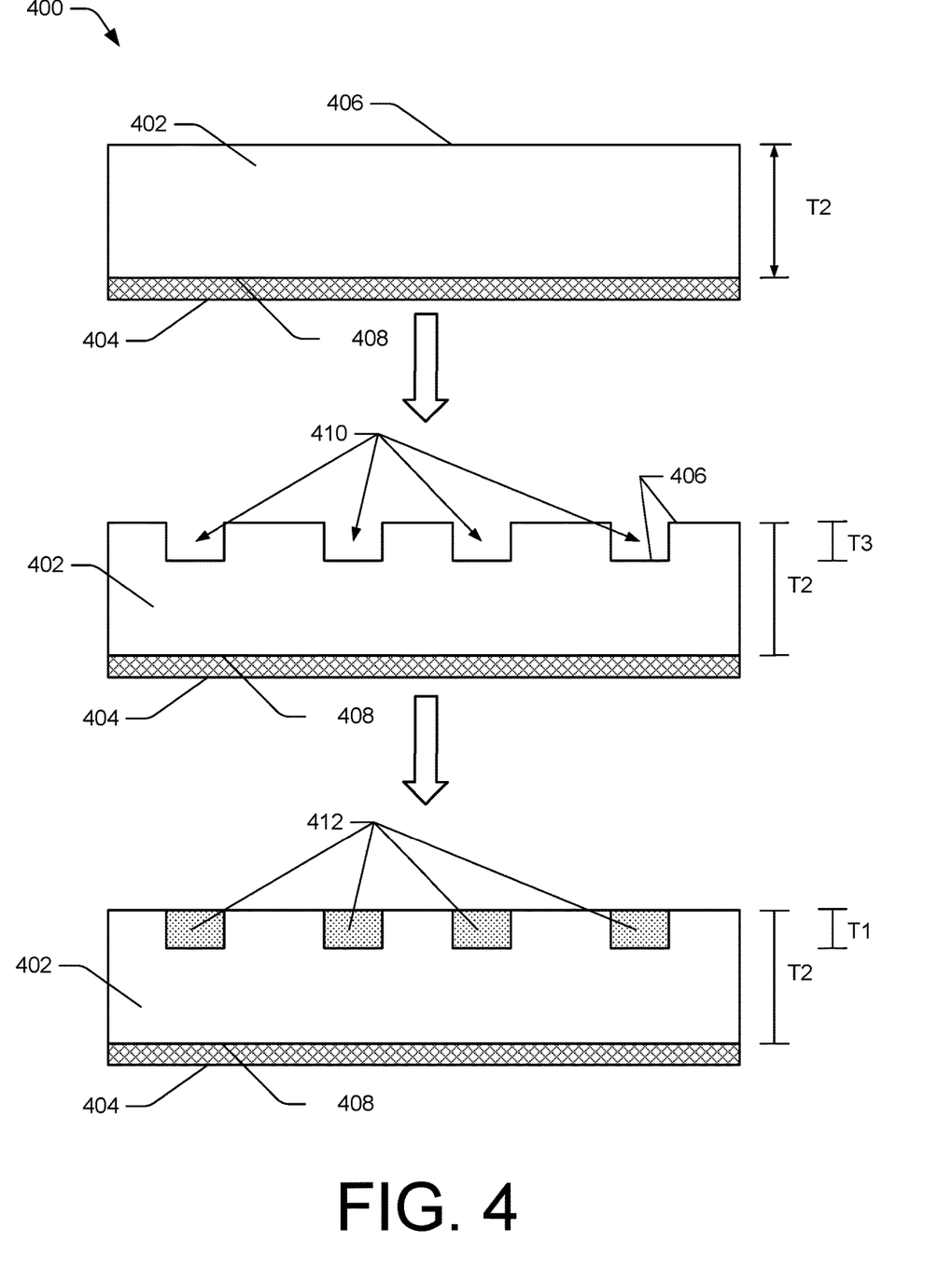
FIG. 4 is a schematic flow diagram of a process of manufacturing a scintillator, from a side view of the scintillator, according to one or more examples of the present disclosure.

Now referring to FIG. 4, according to certain examples, a process 400 of producing the scintillator 110 is illustrated. The process 400 may be used to produce any one or more of the examples of the scintillator 110 disclosed herein. The process 400 optionally includes disposing a layer 402 of organic scintillating material on a substrate 404. The layer 402 has a thickness (T2), defined between a front surface 406 and a back surface 408, that is generally uniform. In some implementations, the thickness T2 of the layer 402 of organic scintillating material is between 0.5 and 10 inches. In particular, the thickness T2 may be about 1 inch.

The process 400 then includes forming a plurality of voids 410 within the front surface 406 of the layer 402 of the organic scintillating material. To form the plurality of voids, some of the organic scintillating material may be removed (e.g., via etching) from a plurality of sections of the front surface 406 of the layer 402. Alternatively, additional organic scintillating material may be disposed at a plurality of sections of the front surface 406 of the layer 402 such that voids are created in remaining sections of the front surface 406 of the layer 402. The voids 410 have a thickness T3, which is less than the thickness T2 of the layer 402 of organic scintillating material. In some implementations, each of the voids 410 have substantially the same thickness T3, while in other embodiments, the voids have different thicknesses T3. The voids 410 may have a thickness between 1 and 100 microns. More particularly, the voids 410 may have a thickness of about 10 microns.

The process 400 includes disposing one or more inorganic material elements 412, having a thickness T1, within one or more of the plurality of voids 412. In some implementations, this step includes disposing a layer of inorganic scintillating material upon the entire front surface 406 of the layer 402 of organic scintillating material and then removing a portion of the inorganic scintillating material to leave spaced-apart inorganic material elements 412 embedded in the layer 402 of organic scintillating material.

Figure 5:
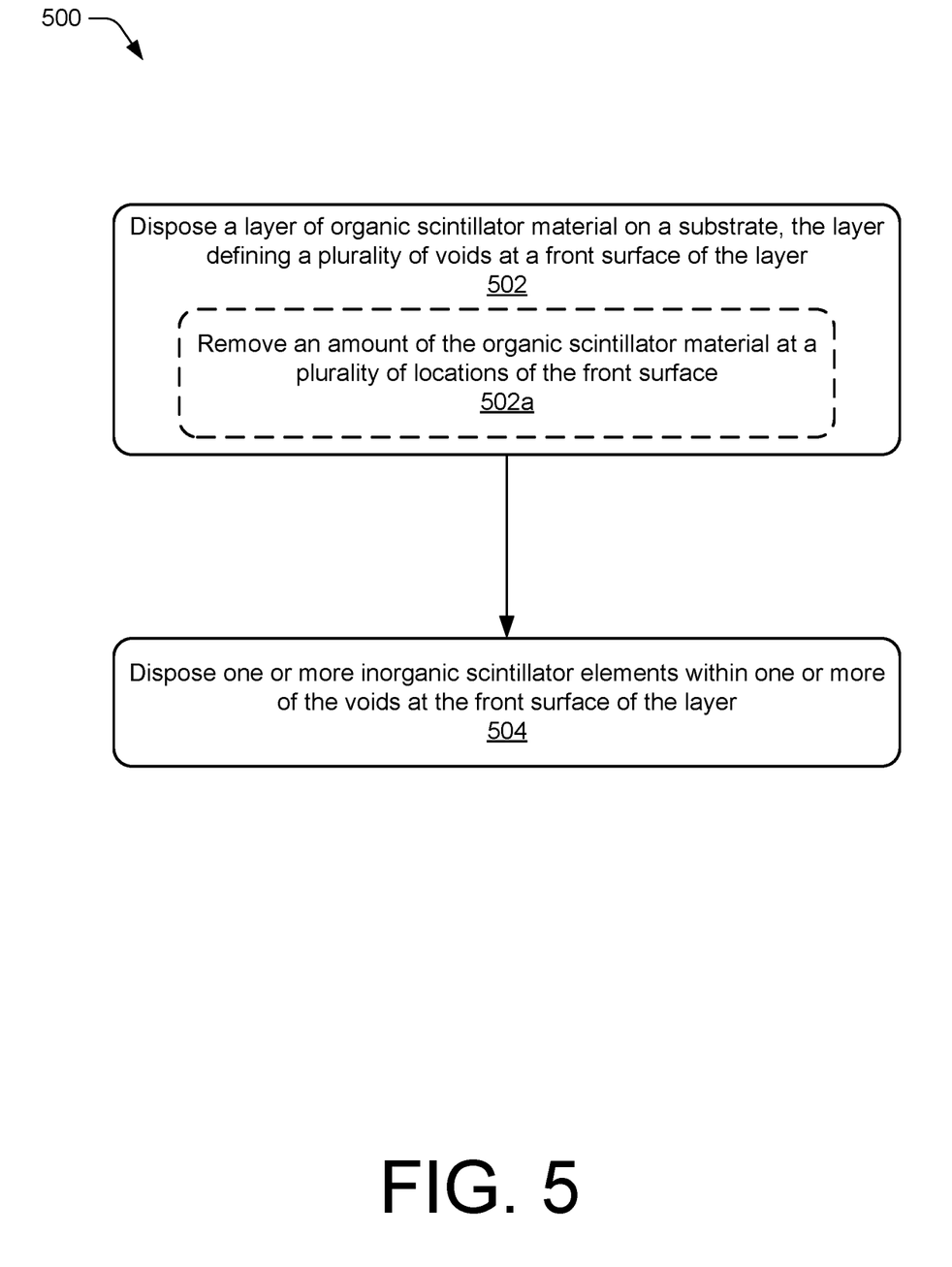
FIG. 5 is a flow diagram of a method of manufacturing a scintillator, according to one or more examples of the present disclosure.

FIG. 5 shows a method 500, according to certain examples, for producing the scintillator 110. The method 500 is performed in producing any one or more of the examples of the scintillator 110 disclosed herein. The method 500 includes (block 502) disposing a layer 402 of organic scintillating material on a substrate 404, the layer 402 defining a plurality of voids 410 at a front surface 406 of the layer 402. In some implementations, the layer 402 of organic scintillating material comprises a back surface 210, 408 adjacent to the substrate 404, and a front surface 208, 406. This operation (block 502) optionally includes (block 502a) removing an amount of the organic scintillating material at a plurality of locations of the front surface 208, 406 to provide the plurality of voids 410.

The method 500 further includes (block 504) disposing one or more inorganic scintillator elements 202, 412 within one or more of the plurality of voids 410.

Figure 6:
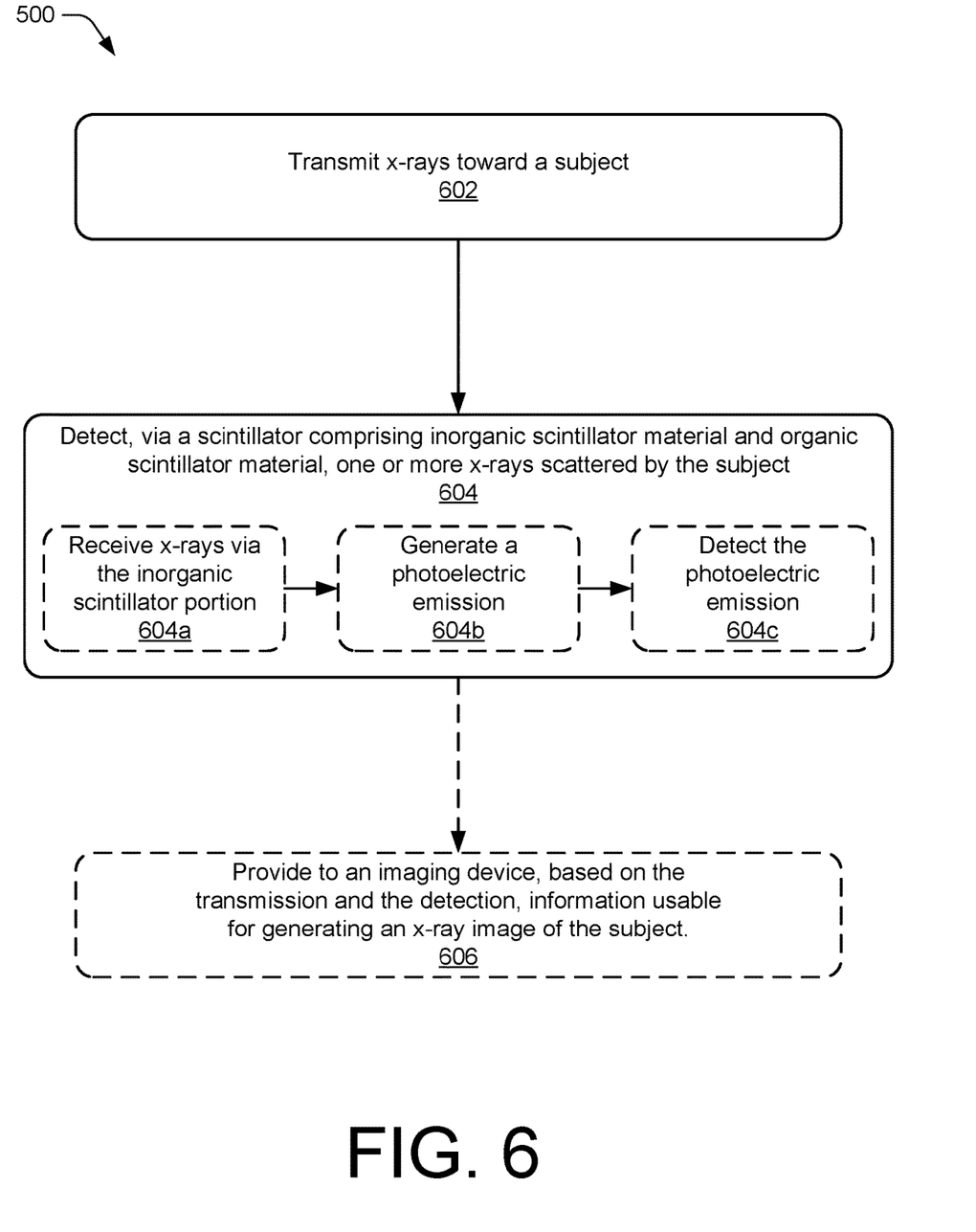
FIG. 6 is a flow diagram of a method of operation of an x-ray backscattering system, according to one or more examples of the present disclosure.

FIG. 6 shows a method 600, according to certain examples, of operation of an x-ray backscattering system 102. The method 600 is performed using any one or more of the examples of the scintillator 110 disclosed herein. The method 600 includes (block 602) transmitting x-rays 118 toward a subject 120. For example, the method may include transmitting, via an x-ray tube 104 of the x-ray backscattering system 102, x-rays 118 toward a subject 120.

The method also includes (block 604) detecting, via a scintillator 110 of the x-ray backscattering system 102, one or more x-ray photons 122 scattered by the subject 120. The scintillator 110 may be any one of the scintillators 110 disclosed herein. For example, the scintillator 110 comprises an inorganic scintillator portion 112 made of an inorganic scintillating material and comprising one or more inorganic material elements 202. Each inorganic material element 202 of the one or more inorganic material elements 202 comprises an outer surface 204 proximate to the subject 120 and an inner surface 206 opposite the outer surface 204. The scintillator 110 also comprises an organic scintillator portion 114 made of an organic scintillating material and comprising a front surface 208. At least a portion of the front surface 208 abuts the inner surface 206 of at least one of the one or more inorganic material elements 202.

The (block 604) detecting may optionally include (block 604a) receiving at least one of the one or more x-ray photons 122 via the inorganic scintillator portion 112. The (block 604) detecting may also include generating 604b, in response to (block 604) receiving the at least one of the one or more x-ray photons 122, a photoelectric emission within the scintillator 110. The (block 604) detecting may further include (604c) detecting the photoelectric emission via a photomultiplier tube 116 of the x-ray backscattering system 102.

The method optionally includes (block 606) providing to an imaging device 124, based on (block 602) transmitting and (block 604) detecting, information usable for generating an x-ray image (126) of the subject 120.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A scintillator for use in an x-ray backscattering system, the scintillator comprising:
    an inorganic scintillator portion made of an inorganic scintillating material and comprising one or more inorganic material elements, wherein each inorganic material element of the one or more inorganic material elements comprises:
        an outer surface configured to be proximate to a subject to be scanned with the x-ray backscattering system, wherein the outer surface is configured to receive x-ray photons reflected from the subject; and
        an inner surface opposite the outer surface; and
    an organic scintillator portion made of an organic scintillating material and comprising a front surface, wherein at least a portion of the front surface abuts the inner surface of at least one of the one or more inorganic material elements;
    wherein:
        the inorganic scintillator portion further comprises a plurality of the inorganic material elements, spaced apart relative to each other; and
        the plurality of the inorganic material elements are disposed on corresponding spaced-apart first sections of the front surface of the organic scintillator portion, wherein second sections of the front surface of the organic scintillator portion are devoid of the inorganic material elements.

2. The scintillator according to claim 1, wherein the spaced-apart first sections of the front surface of the organic scintillator portion are recessed from the second sections of the front surface of the organic scintillator portion that is devoid of the inorganic scintillating material.

3. The scintillator according to claim 1, wherein the inorganic scintillator portion comprises an inorganic material element disposed upon substantially all of the front surface of the organic scintillator portion.

4. The scintillator according to claim 1, wherein the inorganic scintillating material has an index of refraction that is different from an index of refraction of the organic scintillating material.

5. The scintillator according to claim 1, further comprising a second inorganic scintillator portion made of a second inorganic scintillating material, wherein:
    the organic scintillator portion further comprises a back surface, opposite the front surface; and
    the second inorganic scintillator portion is disposed on the back surface of the organic scintillator portion.

6. The scintillator according to claim 5, wherein the inorganic scintillating material and the second inorganic scintillating material are the same.

7. The scintillator according to claim 5, further comprising a third inorganic scintillator portion made of a third inorganic scintillating material, wherein:
    the organic scintillator portion further comprises one or more side surfaces that extend between the front surface and the back surface; and
    the third inorganic scintillator portion is disposed on the one or more side surfaces of the organic scintillator portion.

8. The scintillator according to claim 1, wherein the organic scintillating material comprises one or more of plastic and polyurethane.

9. The scintillator according to claim 1, wherein the inorganic scintillating material comprises one or more of lead iodide ($PbI_2$), calcium tungstate ($CaWO_4$), and cesium iodide (CsI).

10. The scintillator according to claim 1, wherein:
each of the one or more inorganic material elements have a thickness, defined between the outer surface and the inner surface; and
the thickness corresponds to an energy of x-rays to be emitted by the x-ray backscattering system.

11. The scintillator according to claim 1, wherein:
the organic scintillator portion further comprises a back surface, opposite the front surface;
the organic scintillator portion is configured with a thickness, defined between the front surface and the back surface; and
the thickness corresponds to an energy of x-rays to be used in the x-ray backscattering system.

12. The scintillator according to claim 1, wherein the organic scintillating portion couples the inorganic scintillating portion with a photomultiplier tube.

13. A method of manufacturing a scintillator, the method comprising:
disposing a layer of organic scintillating material on a substrate, wherein:
the layer of organic scintillating material, when disposed, comprises a back surface, directly adjacent to the substrate, and a front surface that is opposite the back surface; and
the layer of organic scintillating material comprises a plurality of voids formed in the front surface; and
disposing one or more inorganic material elements within one or more of the plurality of voids;
wherein disposing a layer of organic scintillating material on a substrate comprises removing an amount of the organic scintillating material at a plurality of locations of the front surface, the removed amount of organic scintillating material defining the plurality of voids formed in the front surface.

14. The method according to claim 13, wherein plurality of voids have thicknesses between 1 and 100 microns.

15. The method according to claim 13, wherein:
the layer of organic scintillating material has a thickness, defined between the front surface and the back surface; and
the thickness of the layer of organic scintillating material is between 1 and 10 inches.

16. A method of operating an x-ray backscattering system, the method comprising:
transmitting, via an x-ray tube of the x-ray backscattering system, x-rays toward a subject; and
detecting, via a scintillator of the x-ray backscattering system, one or more x-rays scattered by the subject;
wherein the scintillator comprises:
an inorganic scintillator portion made of an inorganic scintillating material and comprising one or more inorganic material elements, wherein each inorganic material element of the one or more inorganic material elements comprises:
an outer surface facing the subject and an inner surface opposite the outer surface and facing away from the subject; and
an organic scintillator portion made of an organic scintillating material and comprising a front surface, wherein at least a portion of the front surface abuts the inner surface of at least one of the one or more inorganic material elements, and wherein the inorganic scintillator portion is closer to the subject than the organic scintillator portion.

17. The method according to claim 16, wherein detecting one or more x-rays scattered by the subject comprises:
receiving at least one of the one or more x-rays via the inorganic scintillator portion;
generating, in response to receiving the at least one of the one or more x-rays, a photoelectric emission within the scintillator; and
detecting the photoelectric emission via a photomultiplier tube of the x-ray backscattering system.

18. The method according to claim 16, further comprising providing to an imaging device, based on transmitting and detecting, information usable for generating an x-ray image of the subject.

19. The scintillator according to claim 1, wherein the plurality of the inorganic material elements are at least partially embedded within the organic scintillating material of the organic scintillator.

20. The method according to claim 16, wherein:
the inorganic scintillator portion comprises a plurality of inorganic material elements spaced apart relative to each other;
the plurality of inorganic material elements are disposed on corresponding spaced-apart first sections of the front surface of the organic scintillator portion; and
second sections of the front surface of the organic scintillator portion are devoid of the plurality of inorganic material elements.

* * * * *